United States Patent [19]

Michler

[11] Patent Number: 4,599,777

[45] Date of Patent: Jul. 15, 1986

[54] APPARATUS FOR SEPARATING ROLLS WHICH ARE INTERCONNECTED END-TO-END

[75] Inventor: James R. Michler, Wisconsin Rapids, Wis.

[73] Assignee: Consolidated Papers, Inc., Wisconsin Rapids, Wis.

[21] Appl. No.: 744,676

[22] Filed: Jun. 14, 1985

[51] Int. Cl.[4] .......... B23P 19/04

[52] U.S. Cl. .......... 29/239; 29/252; 254/104

[58] Field of Search .......... 29/239, 252, 253; 254/104

[56] References Cited

U.S. PATENT DOCUMENTS

| | | | |
|---|---|---|---|
| 1,242,392 | 10/1917 | Underwood | 29/239 |
| 1,403,589 | 1/1922 | Cinquini | 29/239 |
| 3,021,112 | 2/1962 | Forman | 254/104 |
| 4,494,463 | 1/1985 | Young et al. | 29/252 |

*Primary Examiner*—James L. Jones, Jr.
*Attorney, Agent, or Firm*—Gary, Juettner & Pyle

[57] ABSTRACT

Apparatus for separating two rolls of paper which are interconnected end-to-end, is characterized by a pair of arms pivotally connected at their upper ends and carrying inwardly facing wedges at their lower ends. The arms are advantageously mounted on wheels to facilitate transport of the same, and a hydraulic cylinder extends between the arms intermediate the pivotal connection and wedges. To separate two interconnected paper rolls lying on a floor, the apparatus is positioned to straddle the rolls with inner edges of the wedges aligned on opposite sides of the rolls with the juncture therebetween, whereupon the hydraulic cylinder is actuated to pull the arms together and move the wedges into the juncture to forcefully separate the rolls one from the other.

5 Claims, 3 Drawing Figures

APPARATUS FOR SEPARATING ROLLS WHICH ARE INTERCONNECTED END-TO-END

BACKGROUND OF THE INVENTION

The present invention relates to an apparatus for separating two rolls of sheet material connected end-to-end, and in particular to an improved apparatus for quickly and conveniently separating two rolls of paper connected end-to-end.

In the manufacture of paper, a wide web of paper is usually wound onto a core to form a roll which is relatively long. The long roll of paper is then slit into shorter rolls of appropriate size, and to that end the paper is unwound from the long roll, passed through a slitter and the resulting short sections are then wound onto a plurality of shorter cores arranged side by side on a mandrel. Ideally, the rolls of paper on the short cores are separated one from the other. However, it sometimes happens that adjacent short rolls end up being interconnected end-to-end, for example because adjacent slit edges oscillate back and forth and become interlaced. Should adjacent short rolls of paper be joined, they must be separated before and so that the paper can be removed from the core for recycling, since even two short rolls are of unmanageable size and weight to accommodate convenient removal of the paper from the cores when the rolls are joined.

Various techniques heretofore used to separate two connected short rolls of paper include cutting the rolls apart with a two-man hand saw, picking up the rolls with a fork lift truck and dropping them on a pipe, such that the rolls strike the pipe along their juncture, and/or using a sledge hammer to manually pound wedges into the juncture between the rolls. All of these techniques have been found to be time intensive, inconvenient and usually require at least two people to implement.

OBJECT OF THE INVENTION

The primary object of the present invention is to provide an apparatus for conveniently and efficiently separating two rolls of paper which are interconnected end-to-end.

SUMMARY OF THE INVENTION

In accordance with the present invention, apparatus for separating a pair of rolls of sheet material stuck-together end-to-end along a juncture therebetween, comprises a pair of wedges; means for supporting said wedges on opposite sides of the rolls in alignment with the juncture therebetween; and drive means coupled to said support means for moving the same and said wedges to forcefully move said wedges into the juncture between the rolls on opposite sides thereof to separate the rolls one from the other.

According to a preferred embodiment of the invention, the apparatus is for separating a pair of rolls of paper stuck-together end-to-end along a juncture therebetween, and comprises a pair of arms pivotally connected toward upper ends thereof; a pair of wedges mounted in facing relationship on respective ones of said arms toward lower ends thereof; drive means coupled with said arms for pivoting the same with respect to each other to forcefully move said wedges toward and away from each other; and wheeled transport means supporting said arms toward said lower ends thereof and accommodating convenient movement of said apparatus across a floor. Said arms are configured and adapted, when the paper rolls are on the floor, to straddle the paper rolls with said wedges in alignment with the juncture between and on opposite sides of the rolls, so that upon actuation of said drive means to move said wedges together, said wedges are moved into the juncture between the rolls to separate the rolls one from the other.

The foregoing and other objects, advantages and features of the invention will become apparent upon a consideration of the following detailed description, when taken in conjunction with the accompanying drawings.

DETAILED DESCRIPTION

In manufacturing paper, a web of paper is wound onto a core to form a roll which is usually relatively long. The long roll of paper is then slit into shorter rolls of paper by unwinding the web from the long roll, passing it through a slitter and winding the resulting short sections onto shorter cores carried side by side on a mandrel. The process often results in two adjacent short rolls of paper being interconnected end-to-end, for example because their adjacent slit edges oscillate and become interleaved as the short rolls are wound. When that occurs, the interconnected short rolls must be separated one from the other to facilitate removal of the paper from the cores for recycling.

Figure 1:
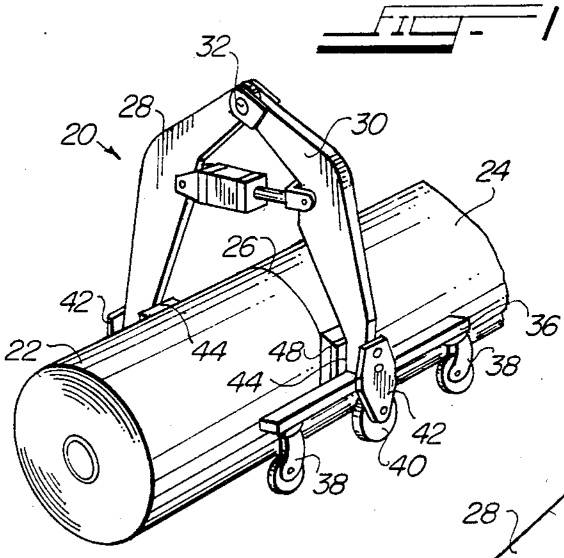
FIG. 1 is a perspective view of the apparatus of the invention, showing the same straddling and in position to separate a pair of paper rolls which are interconnected end-to-end.
Figure 2:
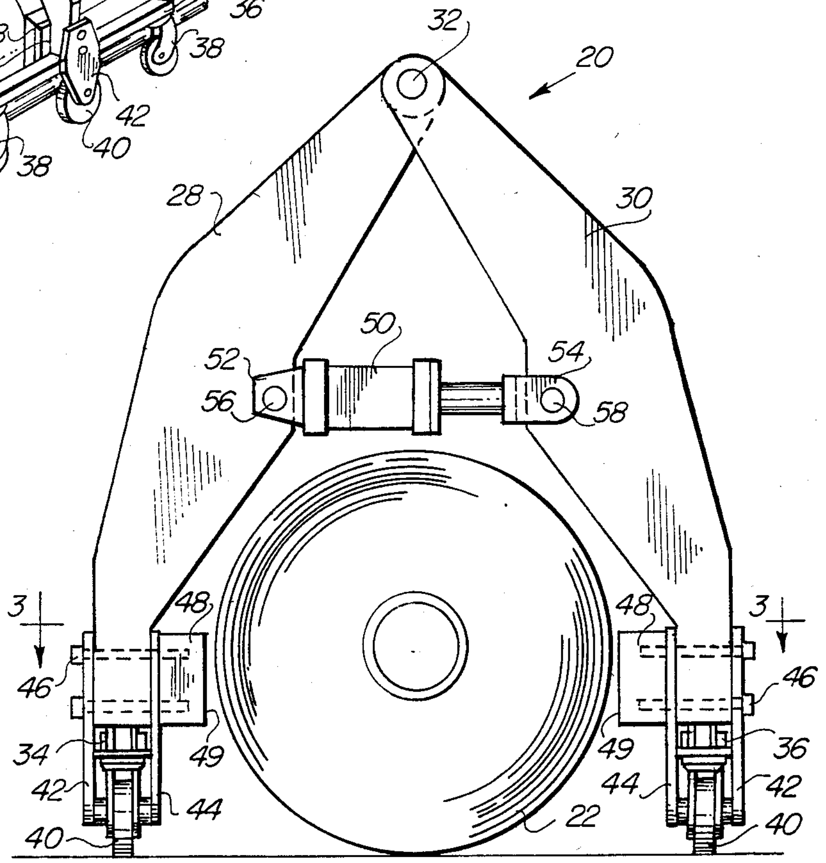
FIG. 2 is a side elevation view of the apparatus.
Figure 3:
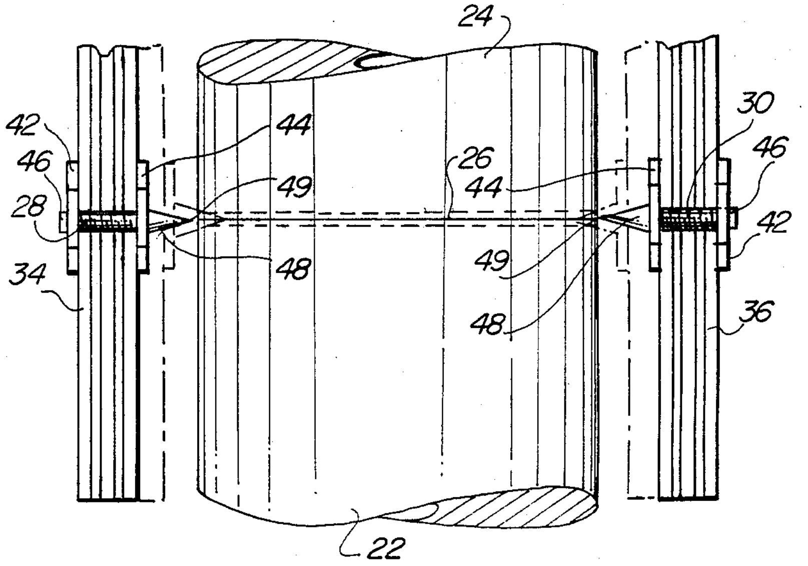
FIG. 3 is a fragmentary view taken substantially along the lines 3—3 of FIG. 2.

Referring to FIGS. 1 and 2, in accordance with the present invention there is indicated generally at 20 an apparatus or roll breaker for separating two short rolls of paper 22 and 24 which are interconnected end-to-end along a juncture 26. The roll breaker includes a pair of arms 28 and 30, the arm 30 of which has a clevis at its upper end for pivotal connection with the upper end of the arm 28 by means of a pin 32.

The arms 28 and 30 are appropriately configured and of sufficient length to straddle the paper rolls 22 and 24, which may have a diameter of 42" or more, and to facilitate movement of the roll breaker 20 and positioning of the same with the arms in straddling relationship about the paper rolls, the lower ends of the arms 28 and 30 are carried by wheeled transport means including a pair of rails 34 and 36. Caster wheels 38 are at opposite ends of each rail, and a pair of wheels 40 are mounted between lower ends of respective pairs of outer and inner plates 42 and 44 that extend vertically on opposite sides of the rails medially along the lengths thereof. Lower ends of the arms rest on the rails and are received between upper ends of respective ones of the pairs of plates 42 and 44. The lower ends of the arms are connected to and between the plates by means of fasteners 46, and the fasteners are of a length to extend into and mount a pair of wedges 48 on respective inner surfaces of the plates 44 in vertical alignment with the lower ends of the arms.

The wedges 48, which may be on the order of 10" long, 6" wide and 1" thick whereat they abut the plates 44, are adapted to be moved into the juncture between the paper rolls 22 and 24 to separate the same, and for the purpose are tapered to sharp points 49 at their inner ends. To forcefully move the wedges into the juncture, a hydraulic cylinder 50 having clevises 52 and 54 at its opposite ends extends horizontally between and is pivotally connected with the arms 28 and 30 by means of pins 56 and 58. The cylinder may be actuated by any suitable means (not shown), for example by a hand operated or an electric pump, to pivot the arms about the pin 32 and move the wedges 48 toward and away from each other. The cylinder is mounted between the arms at a distance from the pin 32 selected to maximize the forces with which the wedges 48 may be moved together, while at the same time provided some clearance between the cylinder and paper rolls when the arms straddle the rolls.

In use of the roll breaker 20 to separate the interconnected paper rolls 22 and 24, with the rolls lying on a floor, the roll breaker is pushed on its wheels to a position whereat the arms 28 and 30 straddle the paper rolls and the inner pointed ends 49 of the wedges 48 are aligned with the juncture between and on opposite sides of the rolls. The hydraulic cylinder 50 is then actuated to pull the arms together and forcefully move the wedges 48 into the juncture between the rolls, thereby to forcefully separate one from the other. After the rolls are separated, the cylinder is actuated to move the arms apart to remove the wedges from between the rolls, whereupon the roll breaker may be wheeled away from the now separate rolls. Although the hydraulic cylinder may be actuated by a hand operated pump, for speed and ease of operation it is most advantageous to use an electric pump.

While one embodiment of the invention has been described in detail, various modification and other embodiments thereof may be devised by one skilled in the art without departing from the spirit and scope of the invention, as defined in the appended claims.

What is claimed is:

1. Apparatus for separating a pair of rolls of sheet material stuck-together end-to-end along a juncture therebetween, comprising a pair of wedges; means for supporting said wedges on opposite sides of the rolls in alignment with the juncture therebetween; and drive means coupled to said supporting means for moving the same and said wedges to forcefully move said wedges into the juncture between the rolls on opposite sides thereof to separate the rolls one from the other, wherein said supporting means comprises a pair of generally vertically extending arms pivotally interconnected towards upper ends thereof, each said arm carrying a respective one of said wedges toward a lower end thereof and said arms being adapted to straddle the rolls to position said wedges on opposite sides of the rolls in alignment with the juncture therebetween, said drive means is coupled to said arms for pivoting the same relative to each other to forcefully move said wedges into the juncture between the rolls, and including wheeled transport means coupled with said lower ends of said arms for carrying said arms, wedges and drive means and for enabling the same to be conveniently rolled from one position to another.

2. Apparatus for separating a pair of rolls of paper stuck-together end-to-end along a juncture therebetween, comprising a pair of generally vertically extending arms pivotally interconnected toward upper ends thereof; a pair of wedges mounted in facing relationship on respective ones of said arms toward lower ends thereof; drive means coupled with said arms for pivoting the same relative to each other to forcefully move said wedges toward and away from each other; and wheeled transport means supporting said arms toward said lower ends thereof and accommodating convenient movement of said apparatus across a floor, said arm being configured and adapted, when the paper rolls are on the floor, to straddle the paper rolls on opposite sides thereof with said wedges in alignment with the juncture between and on opposite sides of the rolls, so that upon actuation of said drive means to move said wedges together, said wedges are forcefully moved into the juncture between the rolls to separate the rolls one from the other.

3. Apparatus as in claim 2, wherein said drive means comprises a hydraulic cylinder connected with and between said arms.

4. Apparatus as in claim 3, wherein said hydraulic cylinder is pivotally connected with and between said arms at points intermediate said upper and lower ends thereof.

5. Apparatus for separating a pair of rolls of sheet material stuck-together end-to-end along a juncture therebetween, comprising a pair of wedges; means for supporting said wedges on opposite sides of the rolls in alignment with the juncture therebetween; drive means coupled to said supporting means for moving the same and said wedges to forcefully move said wedges into the juncture between the rolls on opposite sides thereof to separate the rolls one from the other; and wheeled transport means coupled with said supporting means for carrying said supporting means, wedges and drive means and for enabling the same to be conveniently rolled from one position to another.

* * * * *